United States Patent [19]

Cummiskey

[11] 4,344,180
[45] Aug. 10, 1982

[54] REDUNDANT WORD FRAME SYNCHRONIZATION CIRCUIT

[75] Inventor: Peter Cummiskey, Clark, N.J.

[73] Assignee: Bell Telephone Laboratories, Incorporated, Murray Hill, N.J.

[21] Appl. No.: 161,170

[22] Filed: Jun. 19, 1980

[51] Int. Cl.³ ............................................... H04L 7/00
[52] U.S. Cl. .................................... 375/116; 370/100; 371/69
[58] Field of Search ...................... 370/100, 105; 371/2, 371/42, 47, 67, 69; 375/106, 110, 114, 116, 146.3 WD; 340/149 R, 167 R, 167 B, 147.5 Y, 825.3, 825.57, 825.61, 825.14; 364/737

[56] References Cited

U.S. PATENT DOCUMENTS

| | | | |
|---|---|---|---|
| 3,737,577 | 6/1973 | Birkin | 178/23 A |
| 4,002,845 | 1/1977 | Kaul et al. | 370/100 |
| 4,004,100 | 1/1977 | Takimoto | 370/105 |
| 4,132,867 | 1/1979 | Siglow | 370/105 |
| 4,133,504 | 1/1979 | Dobler et al. | 371/69 |

Primary Examiner—Benedict V. Safourek
Attorney, Agent, or Firm—John A. Caccuro

[57] ABSTRACT

A frame synchronization arrangement is disclosed for use in a digital data transmission system which utilizes a redundant data word transmission. A selected data word of each frame of data having a fixed location relative to the frame boundary is transmitted twice to provide a framing signal for the receiver circuit. At the receiver circuit the data is shifted through a shift register where a comparator checks predetermined locations of the shift register for redundant data words in the received data stream. Once the redundant data words are detected a valid word received signal is generated. The existence of the valid word received signal together with the known relationship between the location of the redundant word and the frame boundary is used to provide a framing signal.

8 Claims, 3 Drawing Figures

REDUNDANT WORD FRAME SYNCHRONIZATION CIRCUIT

TECHNICAL FIELD

This invention relates to frame synchronization circuits and more particularly to a frame synchronization circuit which establishes frame synchronization by the detection of a code word in the data stream.

BACKGROUND OF THE INVENTION

In synchronous time-division multiplex digital data transmission systems, the transmission of data from a transmitter terminal to a receiver terminal requires framing or timing information to properly demultiplex the received data. The transmitter terminal typically generates bit and framing pulses to align the outgoing bits in appropriate time slots, assembles these bits into frames having a fixed number of bits, and separates adjacent frames with framing bits which define the boundaries between successive frames. The receiving terminal detects the framing signal, disassembles the incoming frames and recovers the bits in each of the time slots.

When noise or other interfering signals in the transmission paths cause errors in the data stream, a loss of framing may occur causing the receiver to reframe. Reframing involves searching through all the bit positions of the received data stream looking for the correct framing sequence.

Prior art framing methods basically utilize either added digit framing, robbed digit framing or statistical framing using an intrinsic characteristic of the data signal. Added digit framing requires the addition of framing bits to the data stream thus reducing the overall information transmission rate. In robbed digit framing certain signal data bits are replaced by framing bits resulting in some signal impairment. In statistical framing the intrinsic data signal requires no dedicated digits but is not as reliable as the other framing methods.

Thus, a continuing problem exists to develop a digital framing method which minimizes the deleterious effects of the framing bits on the information transmission rate, accuracy of the information signal, or reliability of achieving framing. Additionally, it is a problem to minimize the circuitry required to implement the framing method utilized.

SUMMARY OF THE INVENTION

The present invention discloses a framing arrangement which utilizes the transmission of a redundant data word in the data stream as the framing signal of a data transmission. The duplicate or redundant data word has a known fixed bit separation from the original data word as well as having a known fixed bit separation from the data frame boundary. At the receiver unit the framing circuit checks the received data stream for redundant data words having the known fixed word separation. Once the redundant words are detected the location of the frame boundary is established from the known relationship between the positions of the redundant data and the frame boundary.

When the invention is used with data communication systems where data is not redundantly transmitted the disclosed framing method requires the addition of a redundant data word to the data stream. In such an application the framing arrangement is of the added digit framing type and hence reduces the overall information transmission rate of the system. Unlike other added digit framing circuits, however, the disclosed redundant data word framing method not only provides a framing signal but also increases the reliability of the transmission of the duplicated data word.

In data communication systems where it is desirable to increase the error free data transmission rate at the expense of a reduction in the overall data transmission rate, the utilization of the disclosed redundant word framing method results in no additional reductions in data accuracy and no reduction in the data transmission rate which normally accompany the prior art framing methods. Thus, in particular, all data communication systems in which part or all of the data is redundantly transmitted to reduce the transmission error rate can utilize the disclosed framing method without the normal framing overhead or penalties. In data systems in which all data transmissions are redundantly transmitted the framing bits can in fact be the redundantly transmitted data which results in a very powerful framing code.

The disclosed frame synchronization arrangement features a data transmission including a redundant bit having a known bit separation relationship to the original data bit as well as to the frame boundary of the data transmission. The receiver unit includes a comparator circuit arranged to compare bits in the received data stream having the known fixed bit separation. When the redundant data bits are detected a framing signal is outputted.

It is another feature of the disclosed redundant word framing arrangement that it can operate compatibly with existing framing techniques. Hence, added framing bits can be used as part of the data transmission to provide additional framing information resulting in an even more powerful redundant data word framing arrangement.

Additionally, another feature of the disclosed redundant data word framing arrangement enables the use of the same comparator circuitry to generate both a framing signal and a valid received data signal. Thus, the comparator circuit concurrently acts as a frame detector and valid word detector circuit.

BRIEF DESCRIPTION OF THE DRAWINGS

The purpose and operation of the present invention, as well as additional objectives, advantages and features thereof, will be more fully appreciated from the illustrative embodiment shown in the drawing in which.

DETAILED DESCRIPTION

Figure 1:
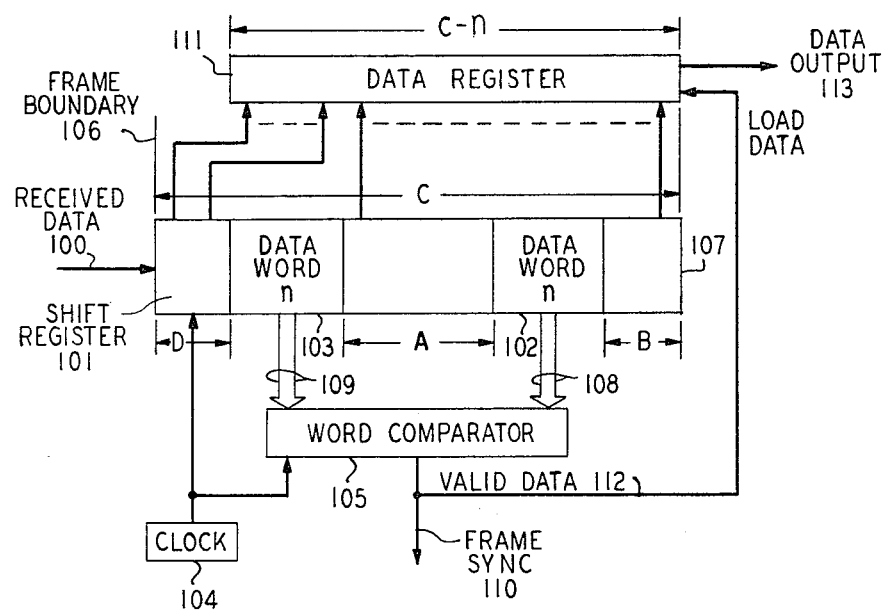
FIG. 1 shows a block diagram of a redundant data word detector circuit used as a frame detector circuit.

Shown in FIG. 1 is a block diagram of a redundant data word detector circuit used as a frame detector circuit. The circuit of FIG. 1 could be part of a data receiver unit which receives data transmissions over a data facility 100 from a remote data transmitter unit (not shown).

Received data from facility 100 is loaded into shift register 101 using clock pulses from clock 104. The size or length of shift register 101 is such that at least a full data frame including original data word 102 and redundant data word 103 are stored for comparison or detection by word comparator 105. As shown in FIG. 1, shift register 101 is one frame (C bits long) long extending between frame boundaries 106 and 107 and including original data word 102 and redundant data word 103. Note that original data word 102 (n bits long) can in fact be any bit length from a one bit long to a half of frame of data bits long. The bit separation between original data word 102 and redundant data word 103 can be any number of bits as long as comparator 105 is wired for the bit separation. Additionally, the bit separation between original data word 102 or redundant data word 103 and frame boundary 107 of the received data can be any number of bits (B of FIG. 1) as long as the redundant data word detector circuit is wired for the bit separation. Bit separation information B is required to time the frame sync signal 110 and to ascertain the frame boundary in the received data relative to the position of the detected original data word 102. Obviously, the bit separation D from frame boundary 106 to the position of redundant data word 103 can be utilized to identify the frame boundary from the detected position of redundant data word 103.

While as described in this specification both the original word to redundant word separation (A+n) and the original word to frame boundary separation (B) are fixed they need not remain so. A code word in the data transmission could specify either of the bit separations enabling the receiver to reprogram the word comparator 105 to check the appropriate bit locations of shift register 101.

As receive data is shifting through register 101 word comparator 105 compares data word 102 with data word 103 via busses 108 and 109, respectively. When data word 102 is not identical with data word 103 no output signal appears on frame sync lead 110. When data word 103 is identical or redundant to data word 102, a pulse is outputted on frame sync lead 110 indicating that an inframe condition exists. Concurrently, the frame sync signal indicates a valid data 112 condition and data register 111 is loaded with data from register 107. Note all the data bits (c-n) except for redundant data word 103 are loaded into data register 111. Data is outputted over lead 113 from data register 111 to a connected circuit (not shown) in the normal well-known manner. The redundant data word framing method has enabled the concurrent detection of frame synchronization and a valid data condition using the same circuitry. Of course, other circuitry can be arranged to implement the disclosed redundant data word framing method.

Note, as with other types of framing circuits certain patterns of received data may cause the circuit of FIG. 1 to indicate a valid frame sync condition at other than at a frame boundary. To increase the reliability of the reframing process additional well known circuitry can be utilized to selectively gate comparator 105 to check for a frame sync condition only at appropriate parts of the received data. For example, the technique shown in FIG. 2 utilizes an alternating framing bit detector together with the redundant word comparator to reduce the probability of false frame sync signals. Finally, the frame sync circuit shown in FIG. 3, utilizes a redundant word and an alternating frame bit which together equal the frame length, to further reduce false frame sync indications.

Figure 2:
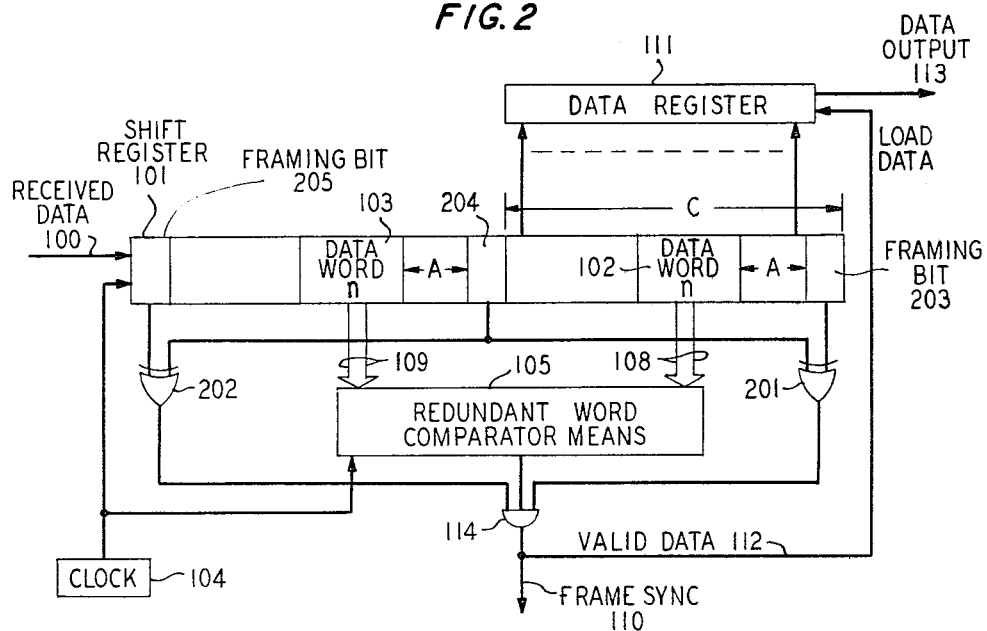
FIG. 2 shows a block diagram of a frame bit detector circuit and redundant data word detector circuit used together to provide a frame synchronization signal and valid data signal.

FIG. 2 illustrates an embodiment of the redundant data word framing circuit utilized together with an added bit framing circuit. In such an arrangement the location of original data word 102 and redundant data word 103 relative to each other and to the location of the frame boundaries, as defined by framing bits (203, 204 and 205), need be known to properly connect comparator circuit 105 and exclusive-OR gates 201 and 202. Valid framing bits 203, 204 and 205 in this embodiment require an alternating one and zero binary logic value. In the arrangement of FIG. 2 an in-frame condition occurs when both a redundant data word is detected in comparator 105 and gates 201 and 202 indicate valid framing bits. A logic 1 signal out of exclusive-OR gate 201 requires that framing bit 203 be different from framing bit 204 while gate 202 requires that framing bit 204 be different from framing bit 205. Gate 114 requires the true (logic 1) output from comparator 105 and gates 201 and 202 to output a frame sync signal indicating an in frame condition. The frame sync output 110 is also used as a valid data signal 112 which enables the loading of data from register 101 to data register 111. Data is outputted from data register 111 in the normal manner over output lead 113.

It is to be understood that while two frames of data are shown being stored in register 101, the system can operate with original data word 102 and redundant data word 103 within the same frame as noted in FIG. 1. Thus, in such a situation, register 101 need only be a frame length C including the frame bit. It is also to be noted that well known and more complicated framing codes can be utilized for framing bits 203, 204 and 205.

Figure 3:
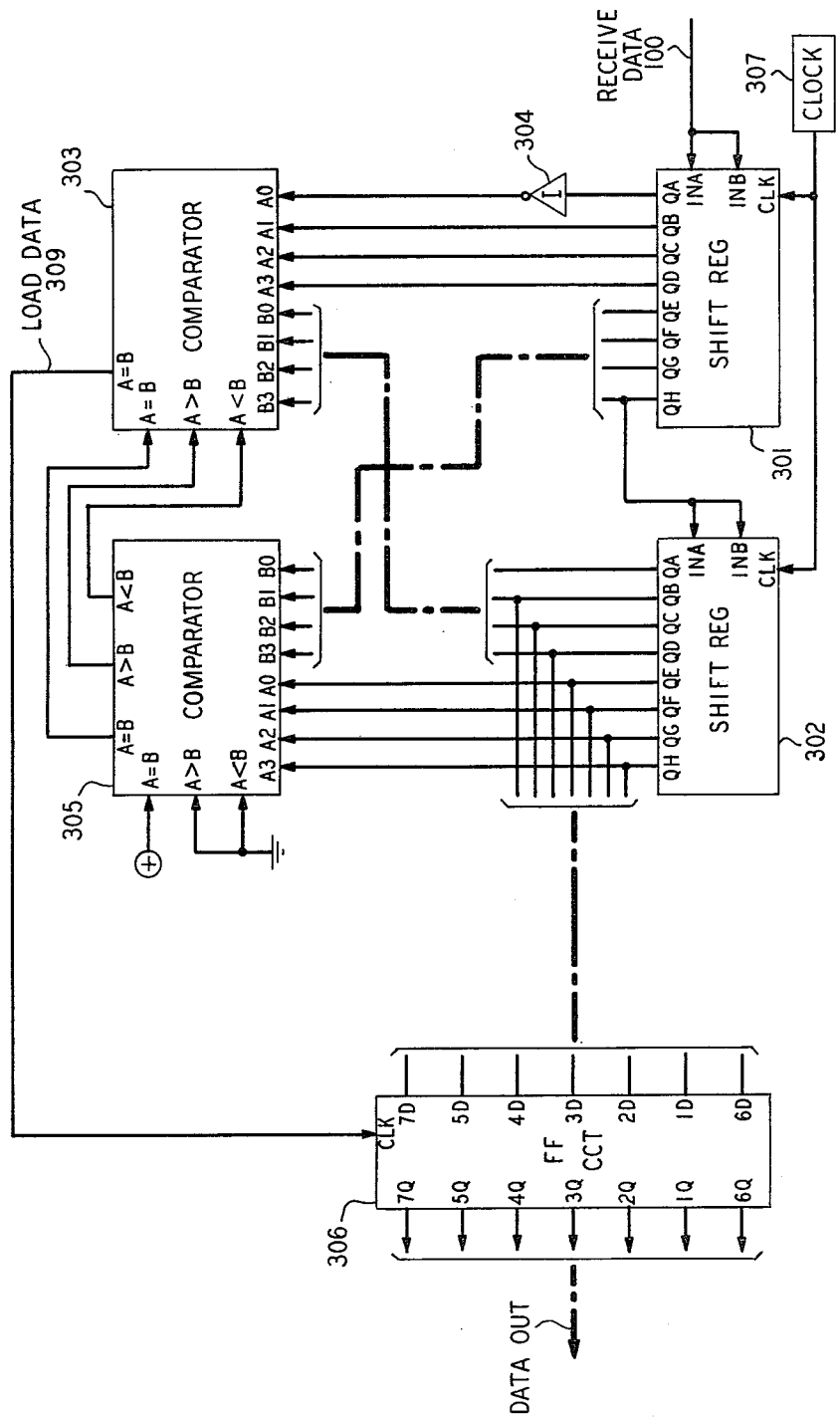
FIG. 3 shows a particular embodiment of the circuit of FIG. 2.

FIG. 3 shows an embodiment of a redundant data word framing arrangement as utilized in a specific data communication system described in my concurrently filed copending patent application. In this embodiment data received over facility 100 is loaded into shift register 301 and 302 using clock signals from clock 307. The data frame size is eight bits including a frame bit which alternates in binary logic value. Comparator circuit 305 has input leads A>B and A<B at logic 0 and input lead A=B at logic 1 (+5 V). Comparator 305 compares the contents of the first four data bits (QE through QH) of each register 301 and 302 against each other. When an identical data match is found output lead A=B of comparator 305 is logic 1. When no match exists output lead A=B is logic 0 and either output lead A>B or A<B is logic 1. When either output lead A>B or A<B is logic 1 output lead A=B of comparator 303 is logic 0, and the comparison made by comparator 303 is irrelevant. When output lead A=B of comparator 305 is logic 1 a comparison of data on leads QA through QD of register 301 and 302 is performed by comparator 303. The received data is loaded in shift register 301 and 302 such that the framing bits occupy slots QA in each shift register. A valid comparison by comparator 303 is possible only if the framing bits are alternating. An inverter 304 inverts framing bit in location QA of shift register 301 for comparison with the framing bit in location QA of shift register 302. When the framing bits are inverse of each other and the data in location QB through QH are respectively identical, a logic 1 load data signal exists on lead 309. Barring any unlikely noise situation, a load data valid comparison signal exists only under the circumstances described above. Since it is unlikely that a noise signal can simultaneously change corresponding bits in adjacent frames of data, a lead data signal 309 does in fact mean an in-frame condition as well as a valid data condition. Register 306 is a parallel load register which accepts the valid data from register 302 when clocked by a logic 1 load data signal on lead 309. The data in register 306 is available for output in parallel form to the connecting circuit. Thus, the addition of gate 304 has enabled a valid word comparison circuit to be utilized concurrently for framing signal detection and valid word detection. Because both valid data words and valid framing bits must be received before a load data signal 309 is generated a more powerful framing and valid data detection results. The load data signal 309 thus represents an in-frame as well as a valid data signal. The above-disclosed circuit is constructed of well known commercially available integrated circuits.

The above description is directed to circuitry for detecting a framing signal which includes a redundant data word. Circuitry for generating a redundant data word in a group of data words, as characterized in the above description, can be easily implemented using standard multiplexing or other techniques well known to one skilled in the art. The resulting generated data stream is illustrated as received data 100 in FIGS. 1, 2 and 3. The disclosed embodiments of my redundant word frame synchronization method are merely illustrative of my invention. Other embodiments known to those skilled in the art would provide other similar functions without deviating from the scope of my invention.

I claim:

1. A frame synchronization arrangement for use in a data communication system, said communication system arranged to transit data words in a frame format including first and second identical data words having a first bit separation therebetween, said first data word having a second bit separation from a data frame boundary CHARACTERIZED IN THAT
said frame synchronization arrangement comprises:
means for serially storing a number of successive data words including the data word immediately following said data frame boundary and said first and second identical data words for a preselected time and then serially outputting all of said stored data words except said second identical data word; and
means for comparing data words in said storing means having both said first bit separation therebetween and said second bit separation to said data frame boundary and generating a valid comparison signal therefrom when the compared data words are the same, which valid comparison signal enables the serial outputting of data words from said storing means and is synchronous with the outputted data word immediately following said data frame boundary.

2. The invention as described in claim 1 wherein said storing means includes means for storing a full frame of successive data words.

3. The invention as described in claim 1 wherein said storing means includes means for storing a group of data words which are not part of the same frame of successive data words.

4. The invention as described in claim 1 wherein said data communication system is further arranged to transmit a predetermined sync bit pattern between data frames CHARACTERIZED IN THAT
said frame synchronization arrangement further comprises:
said storing means further including means for storing a full frame of data words and adjacent sync bits,
means for comparing said adjacent sync bits of a data frame, and
said data word comparing means is further responsive to said sync bit comparing means for generating a valid comparison signal when both the compared data words are the same and said predetermined sync bit pattern is detected in the adjacent sync bits.

5. A frame synchronization arrangement of a data communication system which communicates data words in a frame format, said communication system including a transmitter circuit and a receiver circuit, said transmitter circuit comprising:
means for transmitting data words in a frame format including first and second identical data words having a first bit separation therebetween, said first data word having a second bit separation from a data frame boundary CHARACTERIZED IN THAT
said receiver circuit of said communication system comprises a frame synchronization arrangement including
means for serially storing a number of successive data words including the data word immediately following said data frame boundary and said first and second identical data words for a preselected time and then serially outputting all of said stored data words except said second identical data word; and
means for comparing data words in said storing means having both said first bit separation therebetween and said second bit separation from said data frame boundary and generating a valid comparison signal therefrom when the compared data words are the same, which valid comparison signal enables the serial outputting of data words from said storing means and is synchronous with the outputted stored data word immediately following said data frame boundary.

6. The invention as described in claim 5 wherein said transmitting circuit of said data communication system is further arranged to transmit a predetermined sync bit pattern between data frames CHARACTERIZED IN THAT
said frame synchronization arrangement of said receiver circuit further comprises:
said storing means further including means for storing a full frame of data words and adjacent sync bits,
means for comparing said adjacent sync bits of a data frame, and
said data word comparing means is further responsive to said sync bit comparing means for generating a valid comparison signal when both the compared data words are the same and said predetermined sync bit pattern is detected in the adjacent sync bits.

7. A method of detecting frame synchronization in a data communication system arranged to transmit data words in a frame format including first and second identical data words having a first bit separation therebetween, said first data word having a second bit separation from a data frame boundary, the method comprising the steps of:
(a) serially storing a number of successive data words including the data word immediately following said data frame boundary and said first and second identical data words for a preselected time and then serially outputting all of said stored data words except said second identical data word; and
(b) comparing stored data words having both said first bit separation therebetween and said second bit separation from said data frame boundary and generating a valid comparison signal therefrom when the compared data words are the same, which valid comparison signal enables the serial outputting of data words from said storing means and is synchronous with the outputted stored data word immediately following said data frame boundary.

8. A method of providing frame synchronization for a digital communication system arranged to transmit data words in a frame format the method comprising the steps of:
(a) generating first and second identical data words having a first bit separation therebetween, said first data word having a second bit separation from a data frame boundary;
(b) serially storing a number of successive data words including the data word immediately following said data frame boundary and said first and second identical data words for a preselected time and then serially outputting all of said stored data words except said second identical data word; and
(c) comparing stored data words having both said first bit separation therebetween and said second bit separation from said data frame boundary and generating a valid comparison signal therefrom when the compared data words are the same, which valid comparison signal enables the serial outputting of data words from said storing means and is synchronous with the outputted stored data word immediately following said data frame boundary.

* * * * *